(12) United States Patent
Videcoq et al.

(10) Patent No.: US 9,644,949 B2
(45) Date of Patent: May 9, 2017

(54) METHOD FOR ACQUIRING AND MEASURING GEOMETRICAL DATA OF A DEMONSTRATION LENS ADAPTED TO A SPECTACLE FRAME

(71) Applicant: Luneau Technology Operations, Pont De L'Arche (FR)

(72) Inventors: Jean-Jacques Bernard Joseph Videcoq, Pavilly (FR); Bruno Lucien Bizet, Alizay (FR)

(73) Assignee: LUNEAU TECHNOLOGY OPERATIONS, Pont De L'Arche (FR)

( * ) Notice: Subject to any disclaimer, the term of this patent is extended or adjusted under 35 U.S.C. 154(b) by 258 days.

(21) Appl. No.: 14/482,377

(22) Filed: Sep. 10, 2014

(65) Prior Publication Data
US 2015/0077546 A1 Mar. 19, 2015

(30) Foreign Application Priority Data

Sep. 18, 2013 (FR) ...................................... 13 58971

(51) Int. Cl.
| | |
|---|---|
| *G02C 13/00* | (2006.01) |
| *G01B 11/24* | (2006.01) |
| *G01M 11/00* | (2006.01) |
| *B24B 49/12* | (2006.01) |
| *B24B 9/14* | (2006.01) |

(52) U.S. Cl.
CPC .............. *G01B 11/24* (2013.01); *B24B 9/148* (2013.01); *B24B 49/12* (2013.01); *G01M 11/00* (2013.01); *G02C 13/003* (2013.01)

(58) Field of Classification Search
CPC ........ G02C 7/021; G02C 7/024; G02C 7/028; G02C 13/003; G02C 13/005; A61B 3/111
USPC ........................ 351/41, 159.75, 178; 33/200
See application file for complete search history.

(56) References Cited

U.S. PATENT DOCUMENTS

| | | | | |
|---|---|---|---|---|
| 5,428,448 | A | * | 6/1995 | Albert-Garcia .... G01B 11/2433 33/200 |
| 2007/0273870 | A1 | * | 11/2007 | Divo .................. G01M 11/0214 356/124 |
| 2011/0066276 | A1 | | 3/2011 | Dubois et al. |
| 2011/0141535 | A1 | | 6/2011 | Westcott et al. |

FOREIGN PATENT DOCUMENTS

| | | |
|---|---|---|
| DE | 3230495 A1 | 2/1984 |
| EP | 2305424 A1 | 4/2011 |
| EP | 2306236 A1 | 4/2011 |
| FR | 2854268 A1 | 10/2004 |

OTHER PUBLICATIONS

Search report dated Jan. 30, 2014 in counterpart French application 1358971.

* cited by examiner

*Primary Examiner* — Huy K Mai
(74) *Attorney, Agent, or Firm* — Polsinelli PC

(57) ABSTRACT

A device is used which comprises a transparent support positioned between illumination means and a camera. A frame axis is formed on a demonstration lens, for which the convex face is laid on the support. The contour (34) and the frame axis (10I) are captured, and the barycenter (B) of said contour is determined in order to place a machining adapter therein. Application to the grinding of ophthalmic lenses.

3 Claims, 4 Drawing Sheets

METHOD FOR ACQUIRING AND MEASURING GEOMETRICAL DATA OF A DEMONSTRATION LENS ADAPTED TO A SPECTACLE FRAME

CROSS REFERENCE TO RELATED APPLICATIONS

This application claims priority to Application No. 1358791 filed in France on Sep. 18, 2013 under 35 U.S.C. §119, the entire contents of which are hereby incorporated by reference.

The present invention relates to a method for acquiring and measuring geometrical data of a demonstration lens adapted to a spectacle frame, with view to making ophthalmic lenses similar to this demonstration lens, of the type in which is used a device for acquiring and measuring geometrical data which comprises:

- a transparent support adapted for holding an ophthalmic object;
- on one side of the support, the means for illuminating this support;
- on the other side of the support, a video camera oriented towards the support and optically adapted so as to produce a video signal representative of at least one pattern associated with the ophthalmic object laid on the support; and
- signal analysis and processing means receiving at the input the video signal produced by the camera.

This method is notably applied in order to measure the demonstration lens with view to placing an adapter on an ophthalmic lens blank on the one hand, and reproducing the demonstration lens, as an ophthalmic lens, by machining this blank on the other hand.

As this is well known, an adapter is a part which is attached, for example by adhesive bonding, on a face of the optical (or ophthalmic) glass (or lens) blank to be machined, and which is then attached, in a predetermined angular position, onto one of the two blank-holder half-shafts of the grinder or other machine for machining optical lenses.

FR-A-2 854 268 describes a method of the aforementioned type with which it is possible to obtain data used for driving an NC machine for grinding and/or drilling ophthalmologic lenses.

A demonstration lens is a non-corrective lens in transparent plastic, having the contour, and optionally at least one drill hole or the like, typical of a spectacle frame model for which ophthalmic lenses will have to be machined while observing the shape and orientation of the demonstration lens in said frame.

A geometrical pattern will generally designate the contour of the object, or marking lines natively locating the geometrical axis of the frame, but it may also designate attachment holes or the like formed in the presentation lens. Other marking lines may form patterns, notably lines marking the center of the pupil of a user.

The acquisition of data relating to such geometrical patterns gives the possibility of driving a grinding machine or an NC machine for piercing lenses.

In the aforementioned FR-A-2 854 268, the demonstration lens is laid on the supports with its concave face oriented towards the support. With certain curvatures of the sphere of this face and certain shapes of the contour of the demonstration lens, this lens assumes an equilibrium position which is unknown and which cannot be evaluated from the 2-D image provided by the device. Now, this equilibrium position directly affects the 2-D projection captured by the camera and therefore the obtained image. In such situations, it is therefore impossible from the 2-D image, to accurately measure the shape of the contour for reproduction purposes with a machine for machining ophthalmic lenses like a grinder.

The object of the invention is to suppress this drawback by providing a method which gives the possibility of accurately obtaining in every case the data required for positioning the adapter and for driving the machine for cutting optical lenses.

For this purpose, the object of the invention is a method of the aforementioned type, characterized in that:

- a demonstration lens is taken, having a contour adapted to the frame and two parallel spherical faces;
- a frame axis is drawn on the demonstration lens;
- the convex face of the demonstration lens is laid on the transparent support of the acquisition and measurement device;
- two patterns associated with the demonstration lens are captured, i.e. its contour on the one hand, the frame axis on the other hand and the dimensional characteristics of these two patterns are determined; and
- the position of the barycenter of said contour is calculated.

According to other features of this method:

- the acquisition and measuring device comprises a monitor including a screen, the signal analysis and processing means are adapted so as to provide the monitor with a representative signal of said two patterns and for displaying both of these patterns on the screen, and said barycenter is also displayed on the screen.
- The position of the pupil of the wearer is acquired, relatively to the demonstration lens;
- this position is displayed on the screen as an optical center image;
- on an ophthalmic lens blank, are positioned the optical center and the optical axis of this blank if necessary by taking into account a requested axis correction for the wearer;
- points which define a line parallel to the axis of the frame are drawn;
- the concave face of the blank is positioned on the support by having the optical center which it bears coincide with the optical center image displayed on the screen, and by positioning said line aligned with a frame axis image which appears on the screen;
- an adapter is placed on the convex face of the blank by having the center of the adapter match said barycenter;
- the support is a planar and horizontal supporting plate; and
- the frame axis is parallel to the tangents to two frame circles at the top of the latter.

Non-limiting examples of application of the invention will now be described with reference to the appended drawings, wherein:

FIGS. 1A to 1D schematically illustrate various types of frames;

FIG. 2 schematically illustrates an optical lens blank to be ground;

FIG. 3 schematically illustrates a device for acquiring and measuring geometrical data, used in the method according to the invention;

FIG. 4 schematically illustrates an alternative of the device of FIG. 3;

Figure 1A:
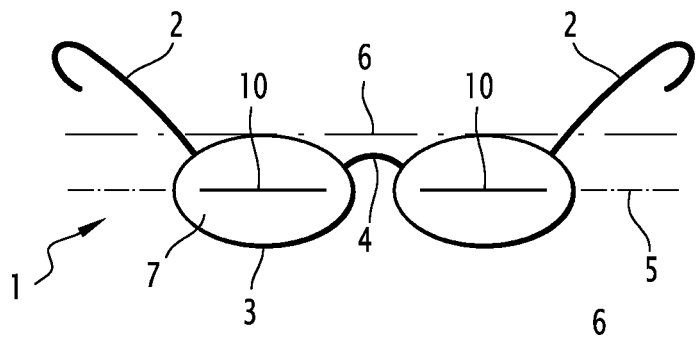

In FIG. 1A, a spectacle frame 1 is illustrated which comprises two branches 2 and two frame circles 3 of an oval shape connected through a bridge 4. With this frame 1 is associated a frame axis 5 parallel to the tangent 6 two both circles 3 at the top of the latter.

The frame 1 is equipped with two transparent and non-corrective demonstration lenses 7, the shape of which should be reproduced accurately from an optical lens blank in order to form a pair of spectacles.

Each lens 7 includes two parallel spherical faces, i.e. one front convex face 8 and a rear concave face 9 (FIG. 5), and bears on one of its faces a line 10 which extends along the frame axis 5.

Figure 1B:
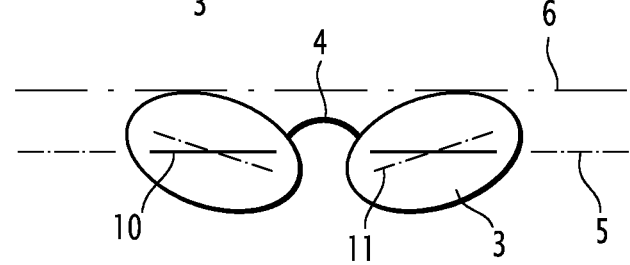
Figure 1C:
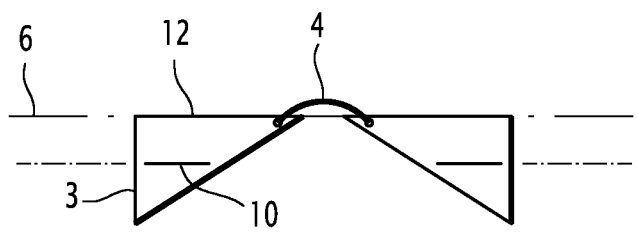
Figure 1D:
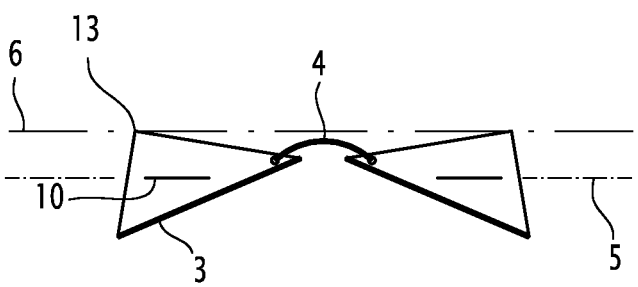

FIGS. 1B to 1D, wherein the branches 2 have not been illustrated, illustrate other types of frames:

FIG. 1B: the ovals of both circles 3 are divergent as « cat's eyes », so that their middle axes 11 are not parallel to the frame axis 5, but form an angle with the latter.

FIG. 1C: the circles 3 have the shape of a right-angled triangle, with their long side 12 in the extension of each other. The tangent 6 thus passes through both sides 12.

FIG. 1D: the circles 3 are similar to those of FIG. 1C, but their upper long sides 12 are divergent and are therefore not parallel to the frame axis 5. The tangent 6 thus passes through the outer upper corners 13 of both circles 3.

Figure 2:
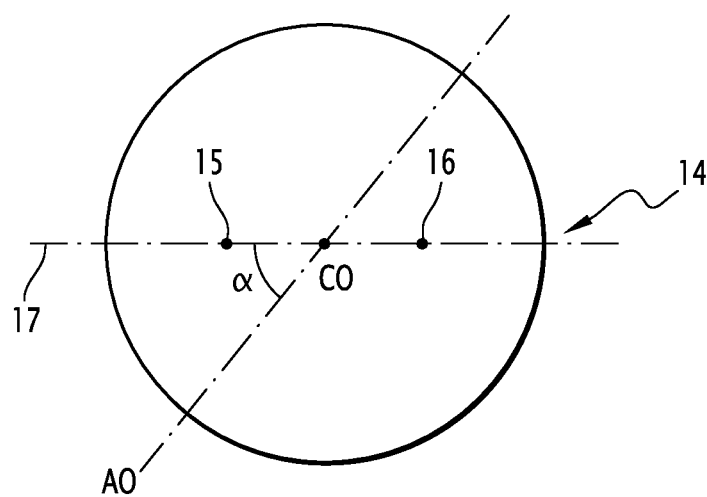

FIG. 2 schematically illustrates a circular optical lens blank 14 intended to be transformed by grinding into an optical lens perfectly fitting into the selected frame 1. The optical center CO of the blank is generally close to the center of its circular contour, and has been illustrated at this center in FIG. 2.

By means of a lensometer, the optician positioned the optical axis AO of the lens according to the prescription. He/she also marked and materialized on the lens, by means of a point CO placed at the optical center and of two points 15, 16 located on either side of the point CO, an axis 17 passing through the point CO and parallel to the frame axis 5, this axis 17 and the optical axis AO forming a prescribed angle α. Depending on the cases, the angle α may be equal to zero or be positive as illustrated in FIG. 2.

Figure 3:
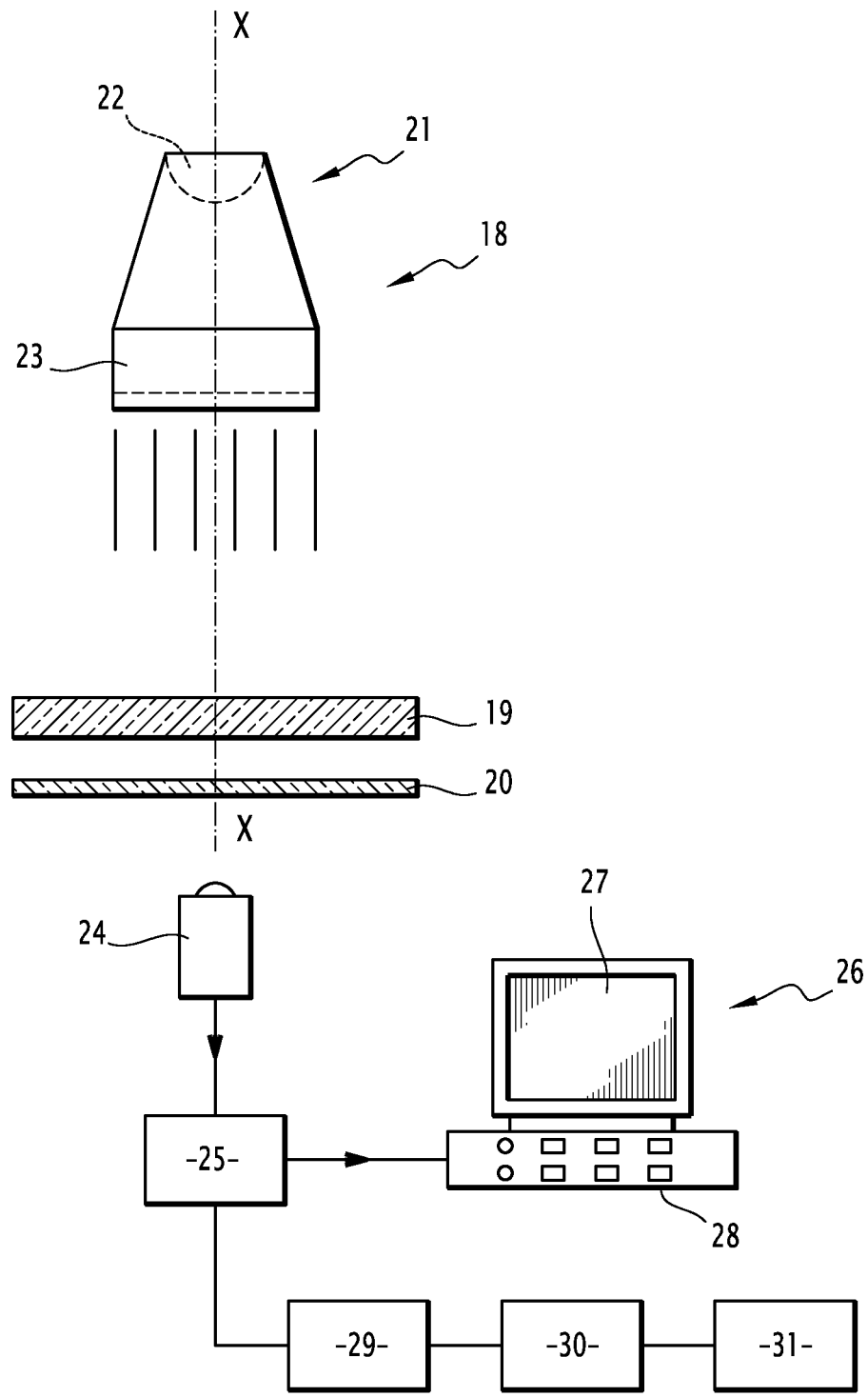

FIG. 3 illustrates an acquisition and measurement device 18, which may notably be as described in the aforementioned FR-A-2 854 268.

The device 18 comprises a support, in particular a planar and horizontal transparent supporting plate 19 on which may be successively placed a presentation lens 7 and a blank 14.

Under the supporting plate 19 is positioned in parallel a flat projection screen 20, which may notably be formed with a ground glass plate or a translucent material sheet of the tracing paper type. Means 21 for a illuminating the analyzed object are placed above the supporting plate 19, so as to illuminate the totality of the object 7 or 14 and to project a shadow of the object on the projection screen 20, through the supporting plate 19. These illumination means 21 essentially consists of a light source 22, for example a LED, and of an optical assembly or collimator 23, generally formed with a set of lenses. This assembly 23 is intended to channel the light radiation emitted by the source, and to ensure regular illumination of the object 7 or 14 with vertical light rays.

The image of the object formed on the projection screen 20, this image in fact being the shadow of the object on this screen, is observed with an array video camera 24 connected to an image analysis and signal processing unit 25, itself connected to a monitor 26. This unit 25 is adapted in order to determine the dimensional characteristics of the patterns are captured by the camera, in a way known per se. The monitor 26 comprises a display screen 27 and a pad 28 for controlling and adjusting the display.

The device further comprises programming means 29 connected to the analysis and processing unit 25 on the one hand and to a control unit 30 of the grinder 31 on the other hand.

As described in the aforementioned FR-A-2 854 268, the analysis and processing unit 25 may comprise image correction means for taking into account the distortion of the pixels depending on the distance to the vertical central axis X-X of the camera 24 and the illumination means 21.

Figure 4:
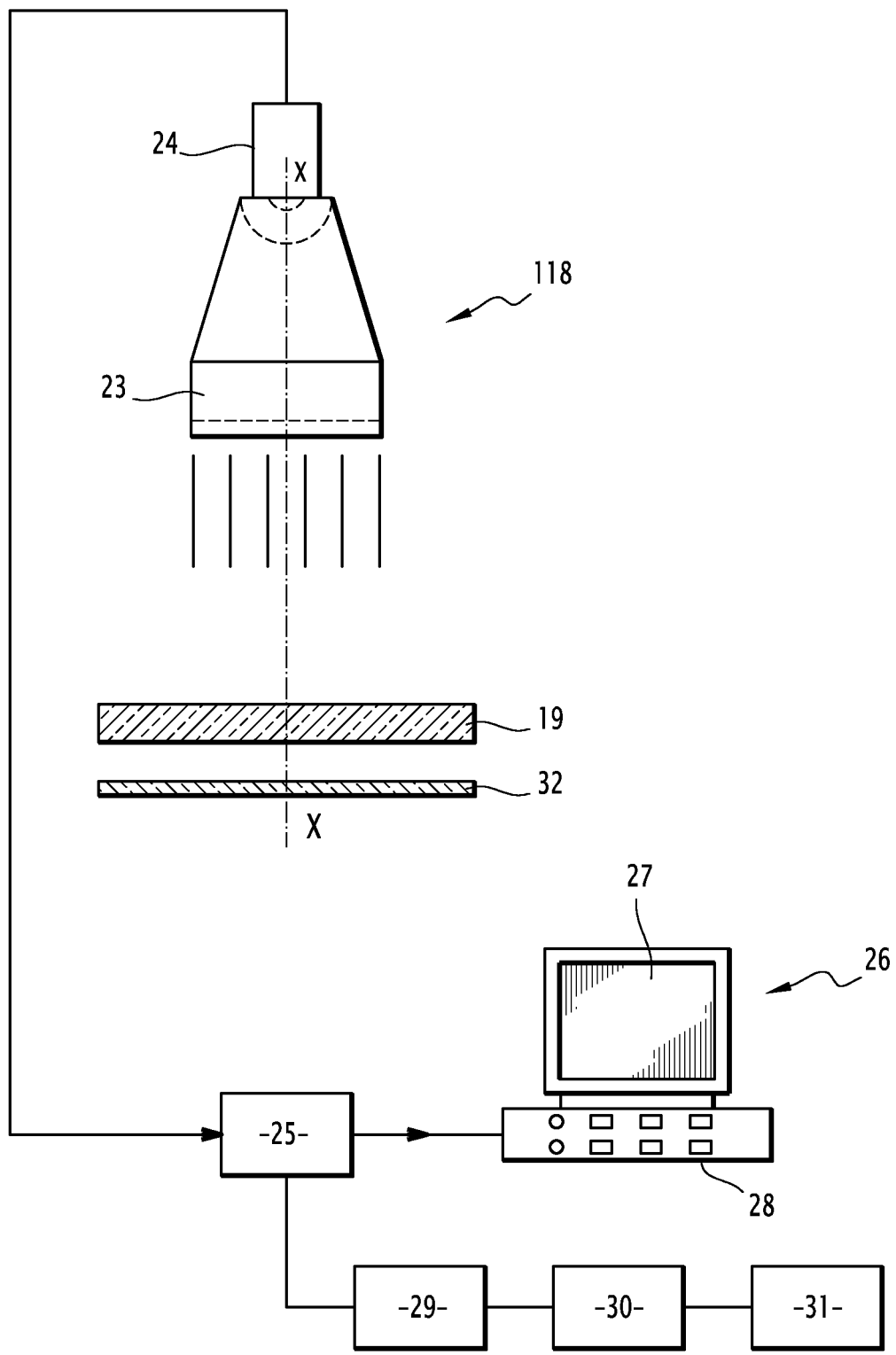

The acquisition and measurement device 118 illustrated in FIG. 4 only differs from the device 18 of FIG. 3 by inversion of the position of the illumination means 21 and of the camera 24.

Indeed, the illumination means 21 are formed with a planar and horizontal scatterer 32 positioned under the support 19, in the place of the screen 20 of FIG. 3, while the camera 24 is positioned above the collimator 23, upon looking downwards along the X-X axis. In this case, it is the image of the object laid on the support 19 which is captured by the camera, and no longer its shadow on a screen as is the case with the device of FIG. 3.

Figure 7:
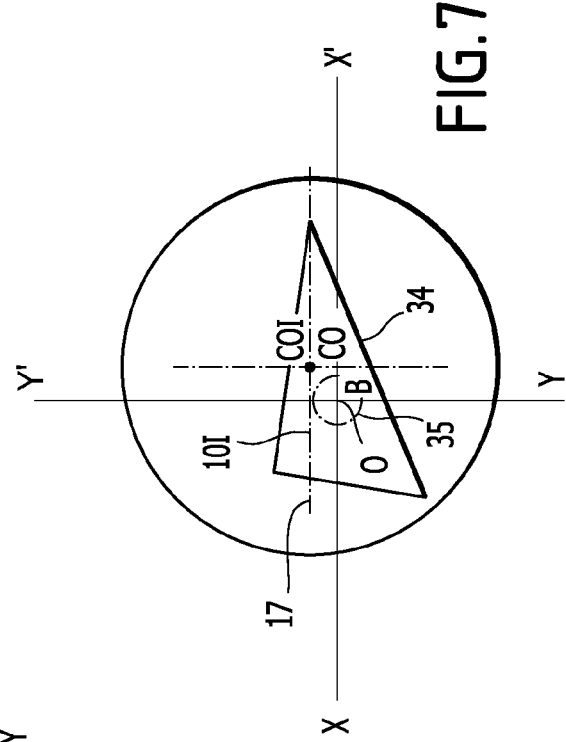
FIGS. 6 and 7 illustrate the subsequent steps of the method.
Figure 6:
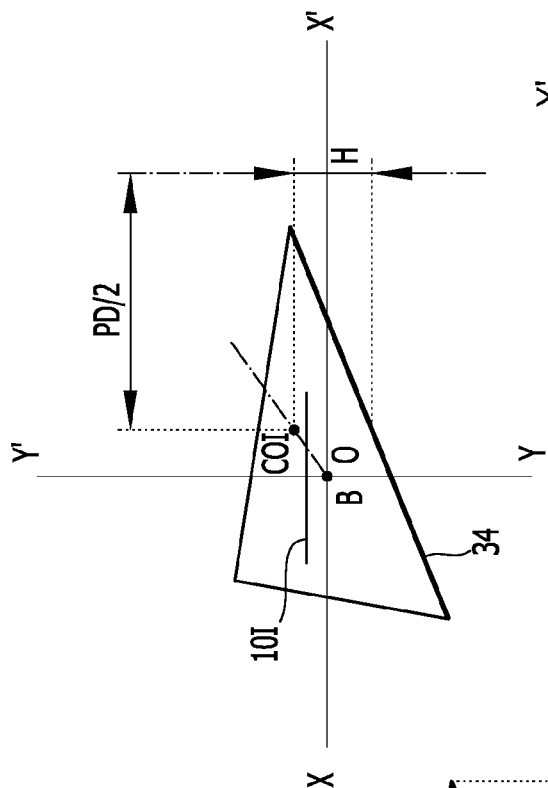
Figure 5:
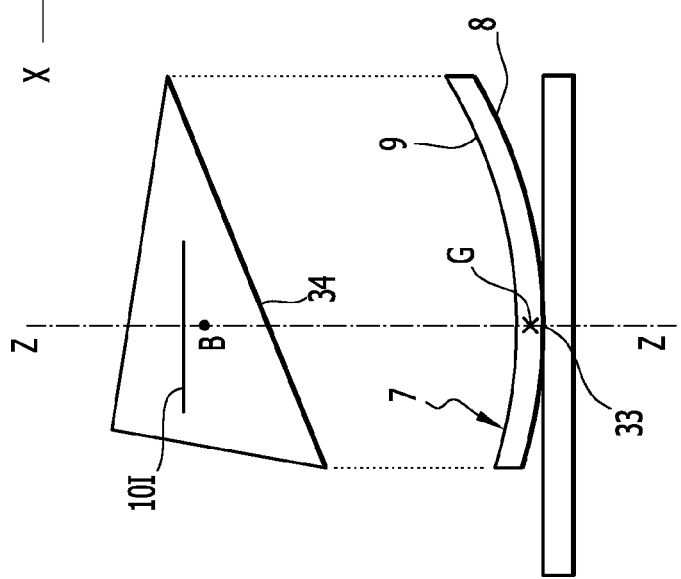
FIG. 5 illustrates the first steps of the method.

With reference to FIGS. 5 to 7, the positioning of the blank 14 of FIG. 2 on the support 19 of the device of FIG. 3 and of that of FIG. 4 is now described.

The demonstration lens 7, assumed to be adapted to the frame of FIG. 1D, is first of all laid on the support 19, with its convex face 8 turned downwards. It will be assumed that the prescribed angle α (FIG. 2) is zero, but it will be understood that the described method simply adapts to the case when the angle α is positive.

As the lens is spherical, it finds a stable equilibrium position determined by its contour, in which the face 8 has a single contact point 33 with the support 19.

As the thickness of the lens is constant and the material is homogeneous, the lens 7 finds is position of equilibrium when the center of gravity G of the lens is at the vertical of the contact point 33.

Further:
if a vertical axis Z-Z is considered, perpendicular to the placement plane and passing through the center of gravity G and the contact point 33, this axis passes through the barycenter B of the 2-D shape, referenced as 34, formed by the projection of the lens 7 on the support 19 and on the screen 20;
as the axis Z-Z is parallel to the line of sight of the camera, at this equilibrium position of the lens, the contour of the lens on the image 34 has its maximum perimeter.

By processing the image captured by the camera 24, the contour of the lens and the barycenter B are determined, as well as the image 10I of the line 10, and the image of the demonstration lens is positioned on the screen 27, relatively to an orthonormal coordinate system X-X', Y-Y' with origin O (FIG. 6), so that the barycenter B coincides with point O and that the line 10I is parallel to the X-X' axis.

The optician then places on the screen the image COI of the optical center CO of the blank 14 in this orthonormal coordinate system according to the position of the pupil of the wearer. To do this, as an example, he/she may capture the pupil half-distance (PD, distance between the two pupils,/2) and the distance H between the pupil and the bottom of the frame plumb with the pupil.

As illustrated in FIG. 7, the optician then lays the concave face of the blank 14 on the support 19. The image of the blank is integrated on the screen and will superpose the information described earlier, i.e. the contour of the presentation lens oriented relatively to the axis of the frame. In this way, the optician positions the blank 14 so that its optical sensor CO coincides with the point COI and that the line 17 is parallel or aligned on the line segment 10I. If α=0, the optical axis AO also coincides with the line segment 10I.

The adapter 35 may finally be attached, for example adhesively bonded, onto the convex upper face of the blank.

The center of the adapter has to be positioned so as to correspond to point O, which itself corresponds to the barycenter B of the 2-D shape of the demonstration lens. The supporting axis of the adapter is then perfectly perpendicular to the surface of the screen, and its angular orientation is conventionally made parallel with the axis 10I.

Finally, in every case, very accurate positioning of the adapter as well as very accurate control of the machining machine is obtained.

Alternatively, the device 18, 118 does not include any monitor 26. The data generated by the unit 25 are transferred to a separate device, a so-called «blocker», for laying the adapter.

For a lens including at least one cylindrical surface or one toroidal surface, the optical axis is aligned respectively with a generatrix of the cylinder or with a generatrix with radius r or R of a torus, defining the cylindrical or toroidal surface of the lens. Typically, the optical axis always passes in a plane containing the optical center of the lens, with the exception of cases where the lens includes a cylindrical surface in combination with a planar surface. The position and orientation of the optical axis of a lens is determined in known manner by means of a lensometer.

The invention claimed is:

1. A method for acquiring and measuring geometrical data of a demonstration lens, with view to producing ophthalmic lenses similar to said demonstration lens,
the method comprising the steps of:
   (a) taking the demonstration lens, said demonstration lens having a contour adapted to a spectacle frame and two parallel spherical faces, including a convex face and concave face;
   (b) drawing a frame axis on the demonstration lens;
   (c) providing an acquisition and measurement device, said acquisition and measurement device comprising:
      a transparent support;
      on one side of the transparent support, illumination means illuminating said transparent support;
      on the other side of the transparent support, a video camera oriented towards the transparent support and producing a video signal; and
      signal analysis and processing means receiving at the input the video signal produced by the camera,
   (d) laying the convex face of the demonstration lens on the transparent support of the acquisition and measurement device;
   (e) capturing with the video camera two patterns associated with the demonstration lens including the contour and the frame axis of the demonstration lens, so that the video signal produced by the video camera is representative of both patterns and determining with the signal analysis and processing means the dimensional characteristics of both of said patterns; and
   (f) calculating with the signal analysis and processing means the position of the barycenter of said contour.

2. The method according to claim 1, wherein the acquisition and measurement device comprises a monitor including a screen, and the signal analysis and processing means provides to the monitor a representative signal of said two patterns and displays said two patterns on the screen, said barycenter being also displayed on the screen.

3. The method according to claim 2, wherein:
   the position of the pupil of the wearer is demonstrated relatively to the demonstration lens;
   said position is displayed on the screen as an image of an optical center;
   on an ophthalmic lens blank, the optical center and the optical axis of said ophthalmic lens blank are positioned, if necessary by taking into account a requested axis correction for the wearer;
   points which define a straight line parallel to the axis of the frame are drawn on the blank;
   the concave face of the ophthalmic lens blank is positioned on the support by having the optical center of the ophthalmic lens blank coincide with the optical center image displayed on the screen, and by positioning said straight line aligned or parallel with a frame axis image which appears on the screen; and
   an adapter is placed on the convex face of the ophthalmic lens blank by having the center of the adapter correspond to said barycenter.

* * * * *